United States Patent [19]

Samoilov et al.

[11] 3,884,891

[45] May 20, 1975

[54] METHOD FOR PREPARING BRANCHED COPOLYMERS BY ETHYLENE WITH UNSATURATED SILICONE MONOMERS

[76] Inventors: Sergei Mikhailovich Samoilov, Simonovsky val 8, kv. 60; Viktor Nikolaevich Monastyrsky, ulitsa Vasilievskaya, 9, kv. 62, both of Moscow; Svetlana Tikhonovna Pudovik, ulitsa Kutuya, 14, kv. 83; Evgeny Vasilievich Kuznetsov, ulitsa Karla Marxa, 72, kv. 10, both of Kazan, all of U.S.S.R.

[22] Filed: July 17, 1972

[21] Appl. No.: 272,661

[52] U.S. Cl. ............ 260/88.1 R; 117/140; 117/141; 117/145; 117/161; 260/33.6 UA; 260/33.8 UA; 260/47 UA
[51] Int. Cl. ............................................ C08f 15/02
[58] Field of Search ................... 260/80 PS, 88.1 R; 117/161

[56] References Cited
UNITED STATES PATENTS

| | | | |
|---|---|---|---|
| 3,240,768 | 3/1966 | Guenther | 260/88.1 R |
| 3,322,807 | 5/1967 | Johnson | 260/80 PS |
| 3,577,399 | 5/1971 | Mortimer | 260/88.1 R |
| 3,644,306 | 2/1972 | Longi et al. | 260/88.1 R |

*Primary Examiner*—Harry Wong, Jr.

[57] ABSTRACT

Branched copolymers of ethylene with unsaturated silicone monomers, useful as water-repellent coatings, having the general formula $R^1CH=CHSiR_m{}^2R_{n-3}{}^3(OR^4)_p$, wherein $R^1$ is H or an aliphatic radical having the number of carbon atoms from 1 to 3; $R^2$ is a saturated aliphatic radical with from 1 to 4 carbon atoms; $R^3$ is phenyl; $R^4$ is a saturated aliphatic radical having from 1 to 10 carbon atoms or an aryl having no more than 2 aromatic rings; $m$ is from 0 to 2, when $R^1 = H$, and from 1 to 3, when $R^1$ is a saturated aliphatic radical; $n$ is from 0 to 3; $p$ is from 0 to 2; and $m + n + p = 3$; can be prepared by copolymerization of ethylene with unsaturated silicone monomers of the above formula, wherein the reaction mixture contains from 0.5 to 85 molar per cent of the silicone monomer, at pressures from 150 to 3500 atm and temperatures of from 40° to 300° C in the presence of free-radical polymerization.

13 Claims, No Drawings

METHOD FOR PREPARING BRANCHED COPOLYMERS BY ETHYLENE WITH UNSATURATED SILICONE MONOMERS

The invention relates to copolymers of ethylene, and more particularly it refers to a method for preparing and using branched copolymers of ethylene with unsaturated silicone monomers.

Branched silicone copolymers of ethylene possess various valuable properties, for example, high thermostability and water-repelling properties.

Known in the prior art are branched copolymers of ethylene with unsaturated silicone monomers having the general formula $R^aCH=CHSi(OR^b)_3$, where radicals $R^a$ are hydrogen or fluorine-substituted alkyls, and $R^b$ are alkyls or hydrocarbon radicals with the simple ether bond (cf. U.S. Pat. No. 3,225,018, 1961; Losev, V. B., Monastyrsky, V. N., and Golosov, A. P., Inventor's Certificate of the U.S.S.R. No. 241,006, 1967, Bull. of Inventions, No. 13, 1969; Samoilov, S. M., Kadina, M. A., and Monastyrsky, V. N., Inventor's Certificate of the U.S.S.R., No. 304,261, 1969, Bul. of Inventions No. 17, 1971). Known also are branched copolymers of ethylene with silicone monomers having the general formula $CH_2=CHSiR_3$, where R is hydrogen or alkyl, benzyl or tolyl radicals (cf. U.S. Pat. No. 3,577,399, 1968; West Germany (Offen) 1,809,948, 1968). These copolymers are prepared by copolymerizing ethylene with unsaturated silicone monomers under a pressure to 5,000 atm in the presence of free-radical initiators.

Ethylene copolymers with silicone monomers are known to possess water repellent properties. The substances used as water-repelling materials should combine the following two properties: (1) they must be readily soluble in solvents used for coating with solutions; and (2) must fastly adhere to the surface of the material to which it is applied.

The known branched copolymers of ethylene with unsaturated silicone monomers, however, do not possess this combination of properties. Ethylene copolymers with silicone monomers having the general formula $R^aCH=CHSi(OR^b)_3$ are quite reactive, since the bond —Si—O—C—, which arises among all three substituents at the silicon atom, is weak. For this reason, although possessing good adhering properties, these substances readily form a spatial cross-linked structure and are difficulty soluble (especially after a few months of storage), which interferes with their free usage. Ethylene copolymers with silicone monomers having the general formula $CH_2=CHSiR_3$ are quite readily soluble but do not adhere to the materials to be protected with sufficient strength, and moreover, they do not withstand elevated temperatures.

The object of this invention is to prepare branched copolymers of ethylene with silicone monomers that possess the required water-repelling and adhering properties.

This object has been attained by preparing branched copolymers of ethylene with unsaturated silicone monomers, which, according to the present invention, are compounds having the general formula: $R^1CH=CHSiR_m^2R_n^3(OR^4)_p$, where $R^1$ comprises a saturated aliphatic radical or H; $R^2$ comprises a saturated aliphatic radicals; $R^3$ comprises a phenyl radical; $R^4$ comprises a saturated aliphatic radical or aryl radical having no more than 2 aromatic rings; $m$ is from 0 to 2, when $R^1=H$, and from 1 to 3, when $R^1$ comprises a saturated aliphatic radical; $n$ is from 0 to 3; $p$ is from 0 to 2; $m+n+p=3$.

The number of carbon atoms in saturated aliphatic radicals $R^1$ may be as high as 20, the radicals being linear or branched.

The solubility of the copolymers increases in accordance with the an increase in the number of carbon atoms contained in radical $R^1$ and in the degree of its branching but practicably realizable compounds are those having the number of carbon atoms from 1 to 3.

The number of carbon atoms in the saturated aliphatic radicals $R^2$ can vary from 1 to 20, and the solubility of the copolymers also increases with the increasing length and degree of branching of the radical $R^2$. At the present time, only $R^2$ compounds having from 1 to 4 are carbon atoms practicably obtainable. $R^3$ and $R^4$ can be aryl radicals, with the number of aromatic rings not being over two. Phenyl, naphthyl, xylyl, methylnaphthyl, diphenyl, diphenylmethylene, isopropylbenzene and other radicals are examples of such aryl radicals.

As the number of aromatic rings in these radicals increases, the stability towards elevated temperatures and the solubility of these copolymers increases too. The degree of branching of the substituents at the aryl radicals is also important for the solubility of the copolymers. However, the only practicably realizable silicone monomers are those wherein $R_3$ is phenyl.

$R^4$ radicals also comprise saturated aliphatic radicals having from 1 to 20 carbon atoms. The solubility of the copolymers increases with the increasing length and also with the increasing degree of branching of the aliphatic radicals $R^4$. However, it is impracticable to use aliphatic radicals $R^4$ having over 10 carbon atoms, since the reactivity of the copolymers decreases in this case.

In cases where good solubility is the major requisite for the copolymers, and their reactivity is of secondary importance, $m$ should be 3, and $R^1$ should comprises saturated aliphatic radicals having from 1 to 3 carbon atoms.

The copolymers consist of $[—CH_2—CH_2—]$ links and $[—R^1CH—CHSiR_m^2R_n^3(OR^4)_p—]$ links of the silicone monomer which are contained in amount of 0.2 – 40 molar per cent. As the concentration of these links increases, the molecular weight of the copolymers decreases while their solubility and reactivity increase.

Water-repellent coatings are most effective with copolymers in which the links $[—R^1CH—CHSiR_m^2R_n^3(OR^4)_p—]$ are contained in an amount of from 1 to 15 molar per cent.

A preferred copolymer possessing water-repellent properties is the copolymer of ethylene with vinylmethyldiethoxysilane containing from 2 to 12 molar per cent of this silicone compound. Vinylmethyldiethoxysilane is easily prepared (by etherification) from a readily available raw material vinylmethyldichlorosilane.

Relatively high-molecular thermostable copolymers are obtained by copolymerization of ethylene with vinyltriphenylsilane, since $Si(C_6H_5)_3$ groups are thermostable and vinyltriphenylsilane is inactive in the reaction of the chain transfer. The preferable concentration of the $Si(C_6H_5)_3$ links in the copolymer is 1–10 molar per cent.

The silicone copolymers of ethylene can be prepared by a method comprising in copolymerization of ethylene with unsaturated silicone monomers under pressure and elevated temperatures in the presence of initiators of free-radical polymerization in which, the unsaturated silicone monomers are compounds having the general formula $R^1CH = CHSiR_m^2R_n^3(OR^4)_p$, where $R^1$ comprises a saturated aliphatic radical or H; $R^2$ comprises a saturated aliphatic radical; $R^3$ comprises a phenyl radical; $R^4$ comprises a saturated aliphatic radical or aryl radical having no more than 2 aromatic rings; $m$ is from 0 to 2, when $R^1$ is H, and from 1 to 3, when $R^1$ is an aliphatic radical; $n$ is from 0 to 3; $p$ is from 0 to 2; and $m + n + p = 3$; the polymerization process being carried out at temperatures from 40° to 300°C and pressures from 150 to 3,500 atm.

The branched copolymers of ethylene with unsaturated silane monomers are prepared at elevated pressures, which may be as high as 10,000 atm.

As the pressure increases, the rate of copolymerization of ethylene with unsaturated silane monomers and their molecular weight increase too, and this improves the protective properties of the copolymer coatings and increases the yields of the copolymers. However, owing to technical difficulties, the synthesis of the copolymers should preferably be carried out at pressures from 500 to 2,500 atm.

The temperature of the copolymer synthesis which may vary from 0° to 350°C, is of importance because it affects the rate of polymerization, the molecular weight, the degree of branching and other properties of the copolymers. The preferable temperature of the copolymer synthesis is from 140° to 250°C.

The composition of the copolymers depends on the concentration of the silicone monomer in the reaction mixture, and in order to obtain copolymers containing up to 40 molecular per cent of the silane monomer links in the copolymer, the reaction mixture should contain from 0.5 to 85 molar per cent of silicone monomers.

Any conventional free radical polymerization initiator can be used to start the copolymerization of ethylene with silicone monomers, but the preferred initiators are peroxides having the following structure: di-tert-butyl peroxide, di-tert.-butylperbenzoate, lauryl peroxide, benzoyl peroxide, and cumene hydroperoxide.

The radical character of the copolymerization process, which is effected in the presence of the initiators of the free-radical type, determine the branched structure of the copolymers of ethylene with unsaturated silicone monomers.

The branched copolymers of ethylene, prepared according to the present invention, differ in their structure from linear copolymers and higher molecular weight copolymers of ethylene with unsaturated silicone monomers, which are prepared by the ionic mechanism over organometallic catalysts.

Although the copolymerization can be effected without the use of solvents, it can, however, be effected in a solvent medium such as in a solution of organic compounds, like benzene, xylene, toluene, chlorobenzene, heptane and others.

Ethylene containing oxygen in an amount of not over 0.001 per cent by volume and water not over 0.5 mg/cu.m. is used for the copolymerization.

The unsaturated silicone monomers and the initiator, or the unsaturated silicone monomers, the initiator and organic solvent (if the copolymerization is carried out in solution) are fed or introduced into an autoclave in a current of ethylene.

The unsaturated silicone monomers and ethylene are taken in the ratio of 0.5 – 85 molar per cent to 99.5 – 15 molar per cent respectively.

The copolymerization reaction is continued for 5-1,000 min. The reaction pressure and temperature are maintained constant to an accuracy of 35 atm and ±2°C. As soon as the copolymerization reaction has ended, the reaction mixture is removed from the autoclave through a system of traps and the polymers are collected. These polymers can be used either without purification, or they can be separated before use from unreacted unsaturated silicone monomers and mechanical impurities. The copolymers can be purified by precipitation from organic solvents (at a concentration of from 1 to 20 per cent by weight), for example from a solution in benzene, xylene, toluene or other solvents. The solution is filtered at a temperature of from 50°–130°C, and the copolymers are then precipitated in 3 to 7 volumes (with respect to the volume of the solvent) of acetone, ethanol, methanol or some other precipitating agent at room temperature. The precipitate is separated on a filter, centrifuged and dried to constant weight at room temperature and a pressure not above 1–2 mm Hg.

Water-repellent coatings are prepared by applying the copolymers onto the surface of the material to be protected by various methods: by applying such copolymers from a solution, from a melt, by the gas-flame deposition method, or by other methods. For example, the material can be immersed into a solution of the copolymer of ethylene with silicone monomers in an organic solvent (benzenes, chlorobenzene, xylene, toluene, dichloroethane, trichloroethylene, etc.) having a concentration of 0.001–25 per cent by weight. The material is held in the solution for 1–600 seconds at a temperature of from 0° to 100°C, whereupon the solvent is evaporated in the air at a temperature of from 20°–100°C to constant weight.

The proposed silicone copolymers of ethylene have substituents connected with the silicon atom by means of reactive links —Si—O—C— and of non-reactive links —Si—C—.

For this reason, such copolymers have sufficient solubility which makes them applicable for coating of materials from solutions. The coatings adhere fast to the surfaces of materials. Moreover, coatings made of the proposed copolymers are stable against elevated temperatures owing to the presence in them of aryl substituents and owing to their ability to form structures that can be sewn.

The water-repellent properties of materials treated with the silicone copolymers of ethylene in accordance with this invention differ, for example, from the properties of the nontreated materials in the following respects: absorption of moisture by woolen fabrics is 40–60 per cent les than the time taken by a water drop soaking into a cotton fabric; absorption of moisture through a treated and filter paper takes 30–120 minutes longer, and the boundary angle of optical glass wettened with water is 30°–55° greater than of the same glass and materials not treated with the copolymers.

After a ten-fold treatment of a fabric with a soap and soda solution, it absorbs 40–70 per cent, by weight, less water than the same fabric not pretreated with the copolymers.

To enable a better understanding of this invention, the following examples, illustrative of the present method for preparing copolymers of ethylene with unsaturated silicone monomers, are presented.

EXAMPLE 1

A solution of 0.008 g of di-tert.-butyl peroxide in 50 g of vinylmethyldiethoxysilane was introduced into a current of ethylene into a swinging autoclave of 437 cc capacity preheated to 160°C. Ethylene containing 0.0008 per cent by volume of oxygen and 5 mg/cu.m. of water was used in the experiment. Into the autoclave was blown ethylene containing 0.0009 per cent by volume of oxygen. The ethylene pressure was raised to 1400 atm and the copolymerization process was continued for 30 minutes at a temperature of 160°C. The pressure in the autoclave was maintained constant during the entire process at a level of 1400 atm by adding ethylene whenever the pressure dropped by 50 atm. The concentration of vinylmethyldiethoxysilane in the mixture of monomers was 4.1 molar per cent. On termination of the process, the reaction mixture was removed from the autoclave through a system of traps. The yield of the copolymer was 8.2 g. The main product was purified by dissolving it in 150 ml of xylene at a temperature of 100°C, with subsequent filtration of the solution at a temperature of 80°C and precipitation of the copolymer with 750 ml of acetone at room temperature. The precipitate was then filtered and dried to constant weight at 20°C and at a residual pressure of 1–2 mm Hg. The resultant pure product was a white substance that was soluble in benzene, xylene, toluene, and trichloroethylene. Its weight was 7.8 g. The copolymer contained 2.8 molar per cent of vinylmethyldiethoxysilane.

EXAMPLE 2

The copolymerization of ethylene with vinylpropyldi(diphenyloxy) silane was carried out as described in Example 1 The concentration of vinylpropyldi(Diphenyloxy) in the mixture of monomers was 211 g (14.2 molar per cent). The process was carried out under a pressure of 3,500 atm at a temperature of 140°C in the presence of 0.1 g of di-tert.-butylperbenzoate. The process was continued for 30 minutes. The resultant copolymer weighed 11.2 g. It contained 5.3 molar per cent of

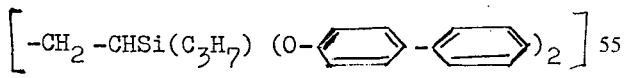

links.

EXAMPLE 3

The copolymerization of ethylene with vinyldibutylnaphthoxysilane was effected as described in Example 1, under a pressure of 1100 atm at a temperature of 300°C in the presence of 0.2 g of cumene hydroperoxide. The reaction was carried out in an autoclave of 100 cc capacity for 5 minutes. The starting quantity of vinyldibutylnaphthoxysilane in the mixture of monomers was 5.5 molar per cent (15 g). The yield of the copolymer was 4.1 g, and the copolymer was a soft greyish mass containing 0.2 molar per cent of vinyldibutylnaphthoxysilane.

EXAMPLE 4

The copolymerization of ethylene with triphenylvinylsilane was carried out as described in Example 1. A solution of 1.5 g of triphenylvinylsilane and 0.01 g of di-tert.-butyl peroxide in 20 ml of benzene were fed into a 100 cc autoclave. The mixture of the monomers contained 1.0 molar per cent of triphenylvinylsilane. The copolymerization was carried out at a pressure of 1800 atm and a temperature of 200°C for 60 minutes. The yield was 20 g of a product containing 1.2 molar per cent of the $[-CH_2 -CHSi(C_6H_5)_3 -]$ links.

EXAMPLE 5

The copolymerization of ethylene with vinylphenyldimethoxysilane was carried out as described in Example 1 in a 100 cc autoclave under a pressure of 2500 atm at a temperature of 150°C. The starting quantity of vinylphenyldimethoxysilane in the mixture of the monomers was 80 g (83.3 molar per cent) and of di-tert.-butyl peroxide, 0.8 g. The process was continued for 30 minutes. The yield was 7 g of the copolymer, which was a greyish sticky mass having a molecular weight of 2100 and containing 36 molar per cent of vinylphenylmethoxysilane links.

EXAMPLE 6

The copolymerization of ethylene with vinyltriphenylsilane was carried out as described in Example 1. A solution of 40 g of triphenylvinylsilane and 0.05 g of cumene hydroperoxide in 35 ml of benzene were fed into a 100 cc autoclave. The mixture of monomers contained 41.3 molar per cent of triphenylvinylsilane. The copolymerization was carried out at 1400 atm and 200°C. for 50 minutes. The yield was 11 g of a product containing 9.7 molar per cent of the $[-CH_2 -CHSi(C_6H_5)_3 -]$ links. The copolymer was readily dissolved in solvents and had a melting point of 90°C.

EXAMPLE 7

The preparation of a copolymer of ethylene with propylvinyldimethylphenylsilane was carried out as described in Example 1. An autoclave of 437 cc capacity was fed with 5.2 g (0.5 molar per cent) of propylvinyldimethylphenylsilane and 0.1 g of lauryl peroxide. The copolymerization was effected under a pressure of 3,100 atm and at a temperature of 100°C for 55 minutes. The yield was 14.3 g of a product containing 0.28 molar per cent of propylvinyldimethylphenylsilane.

EXAMPLE 8

The copolymer of ethylene with vinylmethyldiethoxysilane was prepared as described in Example 1 in an autoclave of 100 cc capacity. The starting quantity of vinylmethyldiethoxysilane was 51 g and of benzoyl peroxide 0.2 g. The reaction mixture contained 38 molar per cent of vinylmethyldiethoxysilane. The copolymerization reaction was continued for ten hours under a pressure of 2400 atm and a temperature of 40°C. The resultant product was 2.6 g of the copolymer, which was a soft greyish and sticky substance having a molecular weight of 3,400. The copolymer contained 11.2 molar per cent of vinylmethyldiethoxysilane links.

EXAMPLE 9

The preparation of ethylene copolymer with vinylmethyldidecyloxysilane was carried out as described in Example 1. The starting mixture contained 64 g (4 molar per cent) of vinylmethyldidecyloxysilane. The copolymerization was carried out at a temperature of 220°C and a pressure of 150 atm for 200 minutes in the presence of 0.06 g of di-tert.-butyl peroxide. The yield was 8.4 g of a solid white copolymer containing 3.2 molar per cent of the [—$CH_2$—$CHSi(CH_3)(OC_{10}H_{21})_2$—] links.

EXAMPLE 10

The preparation of ethylene copolymer with a monomer having the formula

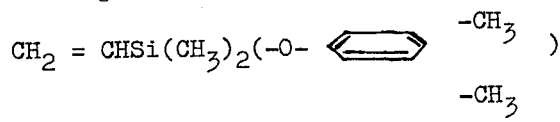

was carried out as described in Example 1. The starting mixture contained 260 g (30 molar per cent) of silane. The copolymerization was carried out under a pressure of 1900 atm at a temperature of 115°C in the presence of 0.1 g of lauryl peroxide for 120 minutes. The yield was 32 g of the copolymer containing 14.6 molar per cent of the

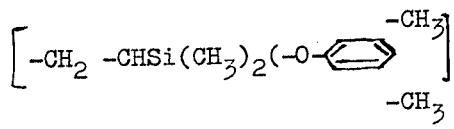

links.

EXAMPLE 11

The copolymerization of ethylene with methylvinyltrimethylsilane was carried out as described in Example 1 in a 50 cc autoclave. The starting mixture contained 4.4 g (5.9 molar per cent) of methylvinyltrimethylsilane. The process was carried out under a pressure of 2,150 atm at a temperature of 175°C in the presence of 0.08 g of di-tert.-butyl peroxide for 45 minutes. The yield was 7.6 g of the copolymer containing 4.4 molar per cent of the [—$CH(CH_3)$—$CHSi(CH_3)_3$—] links.

EXAMPLE 12

A 2.5 per cent by weight solution of the copolymer in xylene or trichloroethylene (or some other solvents) was prepared and samples of cotton or woolen fabric, filter paper or optical glass were placed therein for 1 minute at a temperature of from 0° to 100°C. The samples were then dried at room temperature and weighed. The gain in weight on account of the deposited copolymer was not more than 1 per cent. The thus-treated samples of woolen fabric were then placed into water and kept there at 20°C for 1 hour. The samples were then removed from the water, and the water that had not been absorbed by the fabric was removed by filter paper and the samples were weighed. The water-repellent properties of the copolymer were estimated by the gain in weight.

The pretreated woolen fabric samples were placed in soap and soda solution and kept there for 30 minutes at a temperature of 40°C. The procedure was repeated ten times, and each time the samples were rinsed in water. The samples were then tested for absorption of water and the gain in weight was determined again. A drop of distilled water of 3 mm in diameter was placed on a cotton fabric or filter paper pretreated with the copolymer and the time during which the drop was taken in by the fabric was determined at 20°C.

The boundary angles of wettening of optical glass surfaces with water were determined with a microscope having a scale calibrated in degrees, with the glass placed in the vertical position.

The Table which follows gives the data characterizing the water-repellent properties of the copolymers.

Table

| Tested material | Water absorption of woolen fabric,%(w/w) | | Adsorption time of water drop, minute | | Boundary angle of optical glass wettening with water |
|---|---|---|---|---|---|
| | Immediately after treatment in copolymer | After 10-fold treatment in soap and soda solution | Cotton fabric | Filter paper | |
| Non-treated material | 75 | 90 | 0.04 | 0.06 | 3 |
| Material treated with copolymer as in Example 1 dissolved in benzene. Samples treated at 40°C | 22 | 25 | 78 | 92 | 46 |
| Copolymer as in Example 5 in xylene solution. Samples treated at 100°C | 24 | 48 | 73 | 104 | 49 |
| Copolymer as in Example 5 in toluene solution. Samples treated at 0°C | 18 | 20 | 86 | 97 | 51 |
| Copolymer as in Example 9 in dichloroethane solution. Samples treated at 60°C | 32 | 52 | 41 | 32 | 34 |
| Copolymer as in Example 11 in trichloroethylene solution. Samples treated at 40°C. | 12 | 36 | 100 | 118 | 59 |

We claim:

1. Branched copolymers consisting essentially of ethylene and 0.2-40 mole per cent unsaturated silicon monomers having the formula $R^1CH\!=\!CHSiR_m^2R_{n-3}(OR^4)_p$, where $R^1$ is selected from the group consisting of H and saturated $C_1$–$C_{20}$ aliphatic radicals; $R^2$ is a $C_1$–$C_{20}$ saturated aliphatic radical; $R_3$ is phenyl; $R^4$ is a radical selected from the group consisting of $C_1$–$C_{20}$ saturated aliphatic radicals and aryl radicals having no more than two aromatic rings; $m$ is from 0 to 2, when $R^1$ is H, and from 1 to 3 when $R^1$ is a saturated aliphatic radical; $n$ is from 0 to 3; $p$ is from 0 to 2; and $m + n + p = 3$; said copolymers containing links expressed by the formula $(-CH_2-CH_2-)$ and $(-R^1CH-CHSiR_m^2R_n^3(OR^4)p-)$.

2. Branched copolymers of ethylene according to claim 1 wherein $R^1$ is a $C_1$–$C_3$ aliphatic radical.

3. Branched copolymers of ethylene according to claim 1 wherein $R^2$ is a saturated $C_1$–$C_4$ aliphatic radical.

4. Branched copolymers of ethylene according to claim 1 wherein $R^4$ is selected from the group consisting of a $C_1$–$C_{10}$ aliphatic radical, naphthyl, xylyl, phenyl, and diphenyl radicals.

5. Branched copolymers of ethylene according to claim 1 wherein the copolymer contains from 1 to 15 molar per cent of the $[-R^1CH-CHSiR_m^2R_n^3(OR^{4-})_p-]$ links.

6. Branched copolymers of ethylene according to claim 1 wherein the monomer has the formula $CH_2\!=\!CHSiCH_3(OC_2H_5)_2$ and the copolymer contains from 2 to 12 molar per cent of the $[-CH_2-CHSiCH_3(OC_2H_5)_2-]$ links.

7. Branched copolymers of ethylene according to claim 1 wherein the monomer has the formula $CH_2\!=\!CHSi(C_6H_5)_3$ and the copolymer contains from 1 to 10 molar per cent of the $[-CH_2-CHSi(C_6H_5)_3-]$ links.

8. A method for preparing branched copolymers of ethylene with unsaturated silicone monomers according to claim 1 comprising copolymerizing a reaction mixture of ethylene with unsaturated silicone monomers having the formula $R^1CH\!=\!CHSi\,R_m^2R_n^3(OR^4)p$ where $R^1$ is a radical selected from the group consisting of H and saturated $C_1$–$C_{20}$ aliphatic radicals; $R^2$ is a saturated $C_1$–$C_{20}$ aliphatic radical; $R^3$ is phenyl; $R^4$ is a radical selected from the group consisting of saturated $C_1$–$C_{20}$ aliphatic radicals and aryl radicals having no more than two aromatic rings; $m$ is from 0 to 2, when $R^1\!=\!H$, and from 1 to 3, when $R^1$ is a saturated aliphatic radical; $n$ is from 0 to 3; $p$ is from 0 to 2; $m + n + p = 3$; at pressures of from 150 to 3500 atm and temperatures of from 40° to 300°C in the presence of a free-radical polymerization initiator.

9. A method according to claim 8, wherein the copolymerization of ethylene with unsaturated silicone monomers is carried out at pressures of from 500 to 2500 atm.

10. A method according to claim 8, wherein the copolymerization of ethylene with unsaturated silicone monomers is carried out at temperatures of from 140° to 250°C.

11. A method according to claim 8, wherein the copolymerization of ethylene with silicone monomers is carried out in a reaction mixture containing from 0.5 to 85 molar per cent of the unsaturated silicone monomer.

12. A method according to claim 8, wherein a compound selected from the group consisting of di-tert.-butyl peroxide, di-tert.-butyl benzoate, lauryl peroxide, benzoyl peroxide, and cumene hydroperoxide is used as the free-radical polymerization initiator.

13. A method for preparing water-repellent materials, comprising applying to said materials a solution comprising an organic solvent selected from the group consisting of benzene, xylene, toluene, trichloroethylene, dichloroethane, and chlorobenzene and 15 per cent by weight of said solution of a branched copolymer consisting essentially of ethylene with 0.2–40 mole per cent of an unsaturated silicon monomer having the formula $R^1CH\!=\!CHSiR_m^2R_n^3(OR^4)p$, where $R^1$ is selected from the group consisting of H and saturated $C_1$–$C_{20}$ aliphatic radicals; $R^2$ is a $C_1$–$C_{20}$ saturated aliphatic radical; $R^3$ is phenyl; $R^4$ is a radical selected from the group consisting of $C_1$–$C_{20}$ saturated aliphatic radicals and aryl radicals having no more than two aromatic rings; $m$ is from 0 to 2, when $R^1$ is H, and from 1 to 3 when $R^1$ is a saturated aliphatic radical; $n$ is from 0 to 3; $p$ is from 0 to 2; and $m + n + p = 3$, said copolymers containing links expressed by the formulae $[-CH_2-CH_2-]$ and $[-R^1CH-CHSiR_m^2R_n^3(OR^{4-})p-]$; and evaporating the solvent from said solution.

* * * * *